Jan. 10, 1967    B. W. LOCKE ETAL    3,297,001
BIRD CAGE COVER
Filed July 9, 1965    2 Sheets-Sheet 1
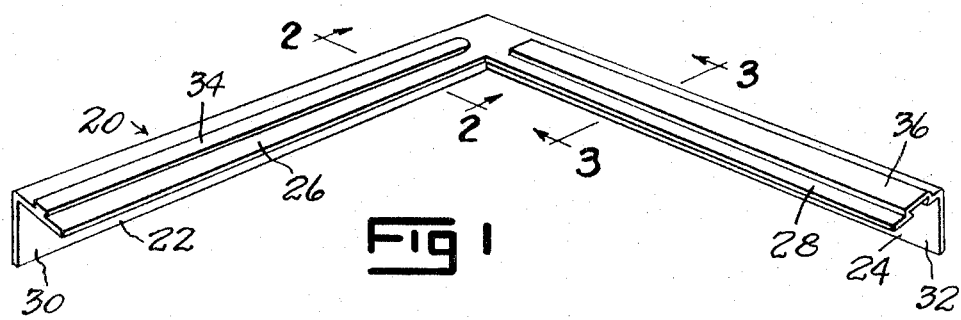
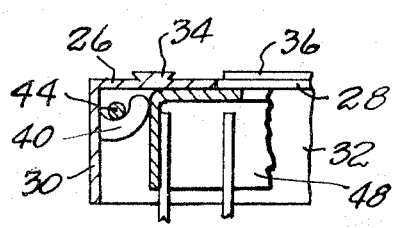 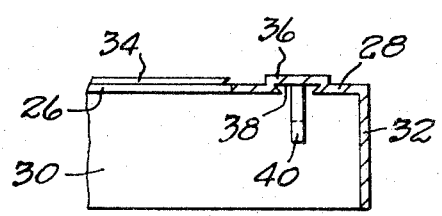
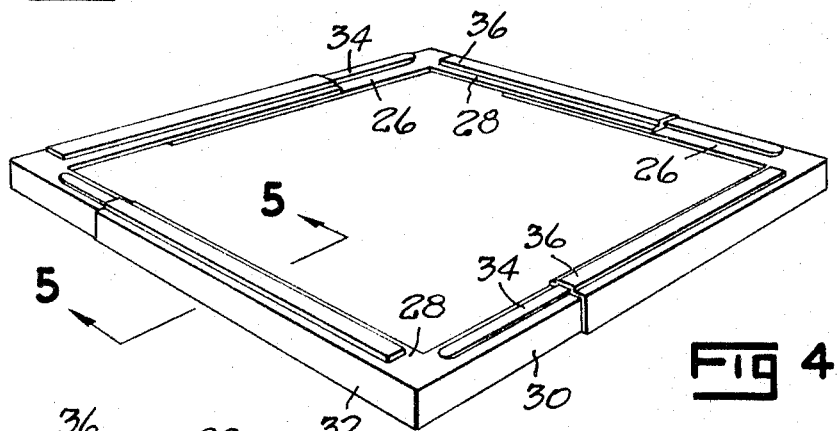
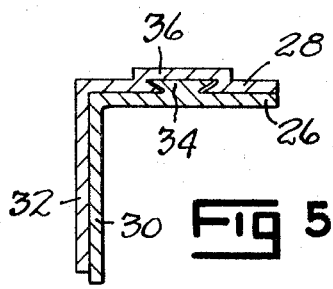
INVENTORS.
BERNARD W. LOCKE
HELEN E. KERCHNER
BY Eugene Knoblock
ATTORNEY

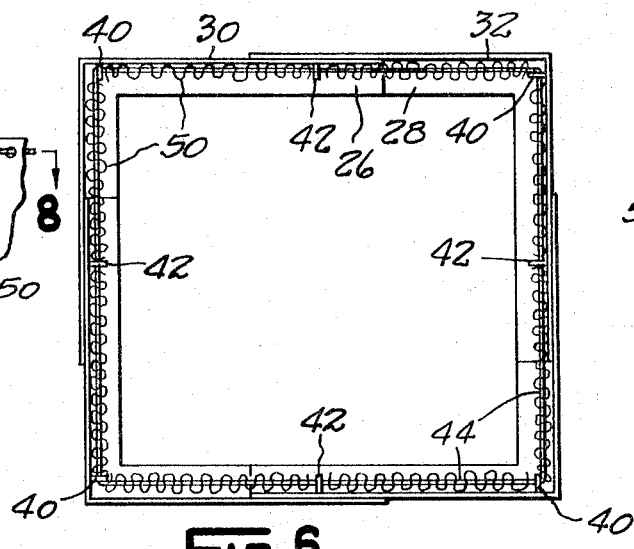
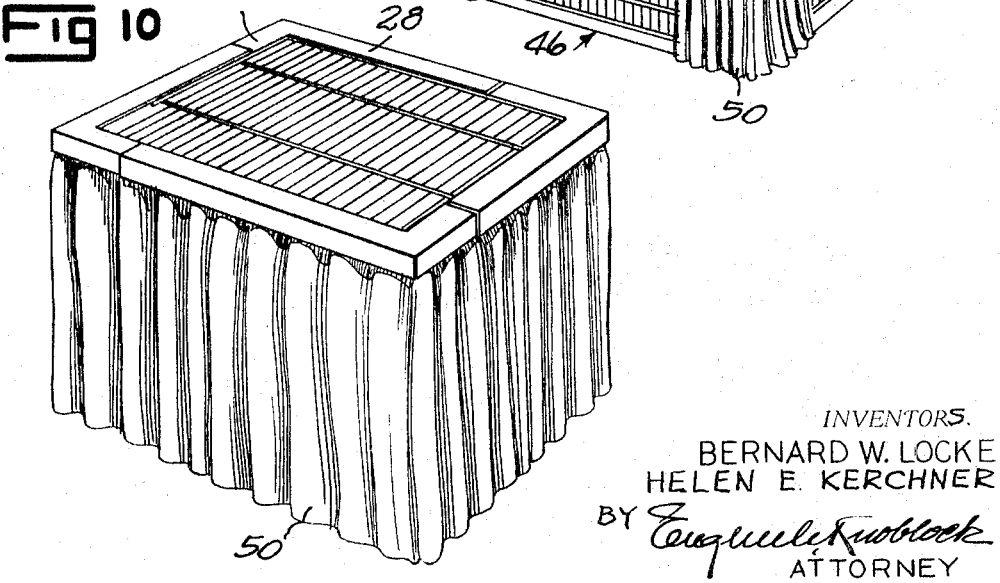

United States Patent Office 3,297,001
Patented Jan. 10, 1967

3,297,001
BIRD CAGE COVER
Bernard W. Locke, Pine Lake Trailer Camp, and Helen E. Kerchner, 245 Pine Lake Ave., both of La Porte, Ind. 46350
Filed July 9, 1965, Ser. No. 470,811
8 Claims. (Cl. 119—17)

This invention relates to improvements in bird cage covers.

Bird cage covers are frequently used for the purpose of closing light to a bird cage so as to simulate darkness when a cage is in a lighted room, and thereby induce the caged bird to be silent. Such cage cover is also used for other purposes in the care and maintenance of birds. Bird cages are constructed of different sizes and shapes, and the formation of a bird cage cover which can be open or closed and which will be effective for use upon a given cage frequently requires tailoring to fit the cage upon which the cover is to be used.

It is the primary object of this invention to provide a bird cage cover which can be produced inexpensively and which is adapted to be applied to and to fit upon bird cages of different sizes and shapes.

A further object is to provide a bird cage cover having drapes which are readily removable for washing thereof and which can be replaced easily and quickly.

A further object is to provide a bird cage cover having a frame composed of a plurality of sections slidably interengaging to form a unit and encircling and bearing upon the upper part of a cage and firmly embracing the same and providing means for support of drape panels therefrom which extend along the sides of the bird cage.

Other objects will be apparent from the following specification.

In the drawings:

FIG. 1 is a perspective view of a section of a drape-supporting frame forming one embodiment of our invention;

FIG. 2 is a fragmentary sectional view taken on line 2—2 of FIG. 1;

FIG. 3 is a fragmentary sectional view taken on line 3—3 of FIG. 1;

FIG. 4 is a perspective view of an assembled frame constructed of frame sections of the character shown in FIG. 1;

FIG. 5 is a sectional view taken on line 5—5 of FIG. 4, illustrating the interconnection of the parts which make up the frame;

FIG. 6 is a bottom plan view of an assembled bird cage cover;

FIG. 7 is a fragmentary view of a portion of a drape and suspension means therefor, as used in the device;

FIG. 8 is a sectional view taken on line 8—8 of FIG. 7 and illustrating the manner in which the drape is folded;

FIG. 9 is a perspective view illustrating the cage cover applied to a cage with the drape panels thereof open;

FIG. 10 is a perspective view of the cage cover applied to a cage with the drape panels thereof closed.

Referring to the drawings, and particularly to FIGS. 1 to 5 thereof, which illustrate the construction of the drape-supporting frame, the numeral 20 designates a frame-forming part or section which is preferably of substantially L-shape, having a pair of elongated arms or portions 22 and 24 extending at right angles to each other and preferably being interconnected or integral and substantially rigid. The part 20 is preferably formed of a molded synthetic resin of either thermosetting or thermoplastic character. Each arm of each frame part forming part 20 is preferably of substantially L-shape in cross-section.

The arm portion 22 is defined by a thin elongated narrow top portion or flange 26 which is substantially coplanar with a thin elongated narrow top portion or flange 28 of the arm portion 24 and extends at an angle thereto, and preferably substantially at right angle. A thin elongated narrow side portion or flange 30 depends from the outer margin of the top flange 26 and a similar thin elongated narrow side portion or flange 32 extends perpendicularly from the flange portion 28. The side flanges 30 and 32 preferably join each other and extend substantially perpendicular to each other. The top flange 26 is preferably provided with an elongated longitudinal central upwardly projecting dovetail flange 34 extending from its free end to a point adjacent the arm portion 24 and substantially equally spaced from the opposite side margins of the flange 26. The opposite arm 24 has a longitudinal central upper offset part 38 extending from the free end thereof to a point adjacent the junction of the arm portions 22 and 24 and spaced substantially equally from the side margins of the flange 28. A dovetail groove 38 is formed in the inner or lower part of the flange 28 extending from the free edge thereof substantially full length of the offset 36. The groove 38 is preferably of a size and shape to slidably receive therein the dovetail flange 34 of a companion frame part or section.

A frame to support a drape or cover is formed by assembling four sections illustrated in FIG. 1 in the manner illustrated in FIGS. 4 and 5, wherein each arm portion 22 of one section fits within an arm portion 24 of an adjacent section with the dovetail flange 34 thereof slidably interfitting in the dovetail groove 38 of the arm 24, as best seen in FIG. 5. The parts will preferably be so arranged that the outer surfaces of the flanges 26 and 30 of the arm portion 22 will have a sliding and supporting engagement upon the inner surfaces of the flanges 28 and 32, respectively, of the interlocking arm portion 24. The elongated dovetail tongue and groove interlock or any other slidable connection between the various parts accommodates the formation of a frame of substantially rectangular character and of extensible and retractable character adjustable in a wide range of dimensions by simple sliding of the assembled parts.

Each frame-forming part 20 has one or more hooks carried by an arm thereof, as at arm 22. In the form shown in FIG. 6, one hook 40 is located adjacent the junction of the arm portions 22 and 24. Each of the hooks 40 preferably projects inwardly from side flange 30 adjacent to but spaced slightly from the top flange 26 as illustrated in FIG. 2. The hooks 40 may be formed integrally with the frame parts or may be formed separately and secured to the frame in any suitable manner. In the preferred construction each arm portion 22 preferably carries a second hook 42 spaced from hook 40 and adjacent to the free end of the arm portion 22. The hooks 42 may be of the same construction and character as hooks 40.

The hooks 40 serve as means to releasably support and anchor adjacent the corners of the assembled frame parts an endless elastic or resilient band or member 44. Where the hooks 42 are used, they also serve to support the elastic 44 between the corner hooks 40. The elastic band serves as means to draw or urge the various sections of the frame into fully telescoped or interfitting relation with the frame retracted to minimum size depending upon the length of the respective arms 22, 24 and of the length and location of the interfitting parts, such as dovetail flanges 34 and 38. The arrangement will preferably be such that, in its assembled form urged by the elastic band 44 to reduced dimension, the dimensions of each side of the frame will be less than the minimum dimension of a side of a bird cage 46 of the type with which the cover is to be used.

The assembled frame may be applied to a cage at the top thereof by sliding the constituent frame sections outwardly against the tension of the elastic band 44 so as to permit the vertical flanges 30 and 32 of the frame to fit around the sides of the cage while the top flanges 26 and 28 of the assembled frame bear upon the margin of the top of the bird cage. It will be understood, however, that in cases where a bird cage has a top marginal frame, the hooks 40 and 42 may engage that frame so as to space the frame flanges 30 and 32 outwardly from the cage frame portion 48, as illustrated in FIG. 2, thereby positioning the elastic band 44 clear of the bird cage when supported by the hooks.

A plurality of flexible panels 50 are supported by the elastic band. For this purpose panels formed of fabric or of flexible synthetic resin web or sheer material may be utilized. Each panel or drape 50 is preferably provided with a line of spaced apertures 52 adjacent one edge thereof as at the top marginal portion thereof, and the elastic band 42 is threaded through those apertures to form the drape folds 54, as illustrated in FIG. 8. The panels may have other slidable support on the frame parts if desired.

It will be apparent that the drape panels 50 may be slid from an open position, as illustrated in FIG. 9, usually located adjacent the corners of the cage in which they expose the major portion of the cage and the bird therein, to a closed or extended position as illustrated in FIG. 10, shutting off light within the cage and concealing the side walls of the cage and the bird therein.

The device is characterized by ready adaptation to bird cages of different sizes and shapes. The elastic band serves to anchor the frame effectively upon the bird cage regardless of the shape and size of the cage. The drape panels can be decorative and are simple in construction and are easy to operate. The drapes can be removed for cleaning by simply disconnecting the elastic band 44 from the hooks 40 and 42 and can be reapplied by remounting the elastic band upon the hooks.

While the preferred embodiment of the invention has been illustrated and described, it will be understood that changes in the construction may be made within the scope of the appended claims without departing from the spirit of the invention.

We claim:
1. A bird cage cover comprising
    an extensible and retractable multiple part frame adapted to fit around the upper portion of a bird cage and to bear marginally thereon,
    an elastic band carried by said frame and normally urging the parts of said frame to a retracted position to fit snugly around said cage, and
    a plurality of flexible drape panels threaded on said band and adapted to span the sides of a bird cage when extended.
2. A bird cage cover comprising
    an extensible and retractable multiple part frame adapted to bear on the margin of the top of a bird cage,
    an elastic band carried by said frame and urging it to a retracted position, and
    a plurality of flexible drape panels having apertures and threaded on said band.
3. A bird cage cover comprising
    an extensible and retractable multiple part frame adapted to be mounted on a bird cage,
    each frame part having a plurality of arms each slidably engaging an arm of an adjacent frame part and having a substantially L-shaped cross section defining an inwardly extending top flange adapted to rest on the margin of the top of said cage and a depending side flange,
    elastic means carried by said frame and urging it to retracted position having a snug fit on said cage, and
    a plurality of flexible drape panels suspended from said frame and shiftable along said frame parts between open and closed positions.
4. A bird cage cover comprising
    an extensible and retractable multiple part frame adapted to be mounted on the top marginal portion of a bird cage,
    each frame part having a plurality of elongated arms each slidably interfitting with an arm of an adjacent frame part,
    elastic means carried by said frame and urging it to retracted position, and
    a plurality of drape panels suspended from said frame and each slidable along one of said frame arms between open and closed position.
5. A bird cage covering comprising
    an extensible and retractable multiple part endless frame adapted to be mounted on the top marginal portion of a bird cage,
    each frame part having a plurality of elongated arms each slidably interfitting with an arm of an adjacent frame part,
    each frame part having an inwardly extending top flange and a depending side flange,
    a hook carried by each frame part adjacent the junction of the arms thereof,
    an endless elastic band carried by said hooks and normally urging said frame parts to retracted position, and
    flexible drape panels threaded on said band and cooperating to encircle said cage when extended.
6. A bird cage cover as defined in claim 4 wherein one arm of each frame part has a longitudinal dovetail groove and another arm of each frame part has a longitudinal dovetail flange fitting slidably in a groove of another frame part.
7. A bird cage cover as defined in claim 3 wherein each frame part has a hook carried thereby adjacent the junction of the arms thereof,
    said elastic means constituting an endless band supported by said hooks and positioned below said top frame flanges and inwardly of said side frame flanges.
8. A bird cage cover as defined in claim 3, wherein at least the innermost arm of each frame part carries a pair of hooks spaced longitudinally of said arm and projecting inwardly thereof,
    one hook being located adjacent to the junction between arms of each part,
    said elastic means constituting an endless band supported by said hooks and supporting said drape panels.

References Cited by the Examiner
UNITED STATES PATENTS

| | | | |
|---|---|---|---|
| 186,711 | 1/1877 | Chapin | 119—17 |
| 2,002,925 | 5/1935 | Robison | 119—17 |

SAMUEL KOREN, *Primary Examiner.*

HUGH R. CHAMBLEE, *Examiner.*